(12) United States Patent
Dove

(10) Patent No.: US 8,635,389 B2
(45) Date of Patent: Jan. 21, 2014

(54) VARIABLE DEPTH BUFFER

(75) Inventor: Daniel Joseph Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 13/114,676

(22) Filed: May 24, 2011

(65) Prior Publication Data

US 2012/0303843 A1 Nov. 29, 2012

(51) Int. Cl.
*G06F 5/00* (2006.01)
*H04L 12/26* (2006.01)

(52) U.S. Cl.
USPC .......................................... 710/52; 370/217

(58) Field of Classification Search
USPC ........................................................ 710/52
See application file for complete search history.

(56) References Cited

U.S. PATENT DOCUMENTS

| | | | |
|---|---|---|---|
| 6,366,557 B1 * | 4/2002 | Hunter | 370/217 |
| 7,310,396 B1 | 12/2007 | Sabih | |
| 2003/0226050 A1 * | 12/2003 | Yik et al. | 713/324 |
| 2009/0323728 A1 | 12/2009 | Koutsoures et al. | |
| 2010/0110952 A1 | 5/2010 | Diab | |
| 2010/0111081 A1 * | 5/2010 | Diab | 370/389 |
| 2010/0115295 A1 * | 5/2010 | Diab | 713/300 |
| 2011/0010474 A1 | 1/2011 | Chen et al. | |
| 2012/0287829 A1 * | 11/2012 | Chang et al. | 370/296 |

* cited by examiner

*Primary Examiner* — Henry Tsai
*Assistant Examiner* — Titus Wong

(57) ABSTRACT

A variable depth buffer includes: a set of buffer units to receive input data in a First in First Out (FIFO) manner, with links between the buffer units such that the input data can be transferred sequentially from a first buffer unit that initially receives the input data to each subsequent buffer unit in the set; and a multiplexer, inputs of the multiplexer being connected to outputs of the respective buffer units and an output of the multiplexer to output data such that a depth of the buffer varies depending on which buffer unit output is selected by the multiplexer.

15 Claims, 5 Drawing Sheets

VARIABLE DEPTH BUFFER

BACKGROUND

Data buffers are often used to temporarily store data as that data is being moved from one location to another. A buffer can also provide a mechanism for handling the speed discrepancy between two different memory locations. For example, when data is transferred from a source device to a receiving device that operates at a lower rate of speed than the source device, the receiving device will be unable to write the data as quickly as it is being received from the faster source device. A buffer can temporarily hold the data from the source device and allow the receiving device the appropriate time to write the received data so that no data is lost during the transfer. Additionally, a buffer may temporarily store data if the component accepting the data is unavailable due to congestion or other reasons.

One type of buffer is a First In First Out (FIFO) buffer. In a FIFO buffer, the data leaves in the same order it arrived, that is the data that first enters the FIFO buffer leaves the buffer before any subsequently entered data. Such a buffer may be implemented as a stream. In a streamed buffer, the data that enters the FIFO buffer moves through the length of the buffer in a sequential manner before emerging at the other end. Thus, the buffer becomes part of the data stream.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
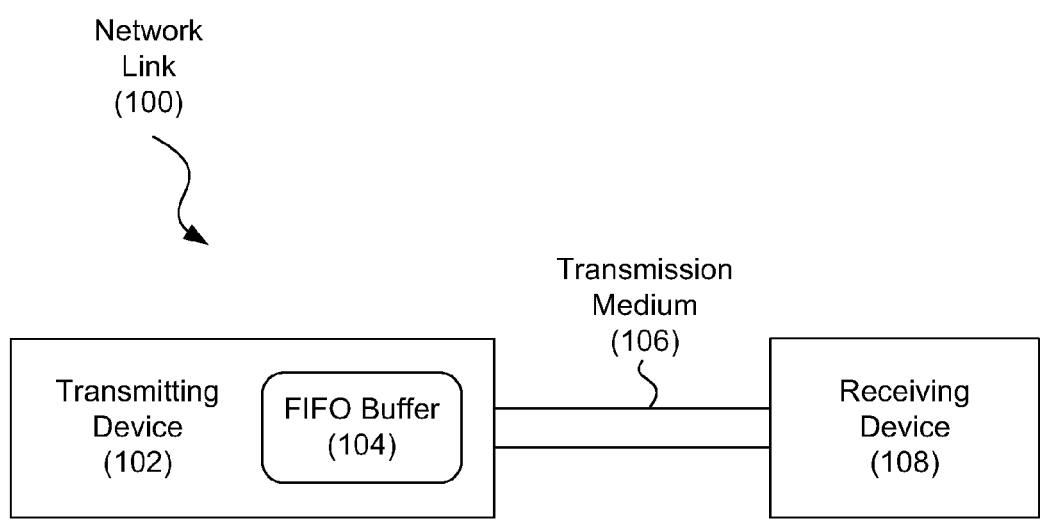
FIG. 1 is a diagram showing an illustrative network link that utilizes a buffer, according to one example of principles described herein.

As mentioned above, when a FIFO buffer is implemented as a streaming buffer, the buffer becomes part of the data stream. However, depending on the demands of the data stream, the buffer may not always be needed, for example, if the rate of data flow slows enough that all the components in the stream can handle the data flow without buffering, the buffer may not be needed until the rate of the data stream again increases.

In such instances, it may be preferable to remove the buffer from the data stream until it is again needed. However, because the buffer is part of the data stream, simply removing the buffer will result in a loss of the data that was in the buffer when the buffer was removed. Alternatively, stopping the data stream and waiting for the buffer to be emptied will result in a lag in the transmission of data. Nevertheless, because the buffer itself adds latency to the system, there is no reason for it to remain in the data stream when it is not being used.

Networking devices often use streaming buffers to handle the timing discrepancies between different network devices. Some networking devices are equipped with Energy Efficient Ethernet (EEE) technology. Such technology allows a device to go into a low power idle mode when no data is being transferred to or from that device. When a source device first establishes a link with a receiving device and starts to transmit data, it may take some time for the receiving device to come out of low power idle. While the receiving device is coming out of the low power idle mode, the source device can start streaming the data into a FIFO buffer. The buffer length can be such that it creates a long enough delay in the data stream to allow the receiving device to come out of its low power idle mode. This avoids the loss of data that would occur if the receiving device was not ready for the data.

However, some network devices, to which the source device connects, do not provide EEE functionality and thus do not need to come out of a low power idle mode. When transmitting to such devices, there is no need for the buffer to be placed within the data stream. Particularly, the additional latency of the system created by the buffer itself may reduce overall performance.

In light of these and other issues, the present specification discloses a variable length buffer that can be adjusted to fit particular situations. According to certain illustrative examples, the variable depth buffer includes a number of buffer units. Each buffer unit holds at least one bit of data. A bit refers to a single logical "1" or a logical "0". In one example, each of the buffer units is connected to a separate input of a multiplexer. A multiplexer is a device that selects one of several inputs to be sent to a single output. The output of the multiplexer will act as the output of the variable depth buffer. By selecting different inputs of the multiplexer, the depth of the buffer is adjusted by adjusting the point at which data exits the stream of buffer units.

In some cases, the multiplexer may be controlled by digital logic circuitry acting as a state machine. As will be described in more detail below, a state machine is a digital element that provides one or more output signals based on its state. The state of the state machine may change based on its current state and a set of received input signals.

In the case where the variable depth buffer is used by a transmitting network device, the state machine may receive a number of signals indicating whether a link has been established to a receiving device and whether that device supports EEE functionality. The depth of the buffer may then be set based on the received signals. For example, if the receiving device does not support EEE capability, then the depth of the buffer may be set at a minimum. Conversely, if the receiving device does indeed support EEE capability, then the buffer depth may be set at maximum. Alternatively, the buffer depth may be set to some intermediate depth according to user defined inputs. Thus, when data begins to stream from the transmitting device to the receiving device, it will be delayed in the buffer while the receiving device comes out of low power idle mode.

Through use of methods and systems embodying principles described herein, a FIFO buffer that is readily adaptable to a variety of purposes is realized. By varying the depth of the FIFO buffer, electronic devices that use that buffer may exercise greater versatility and operate more efficiently.

In the following description, for purposes of explanation, numerous specific details are set forth in order to provide a thorough understanding of the present systems and methods.

It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram showing an illustrative network link (100) that utilizes a buffer (104). According to certain illustrative examples, the network link (100) includes a transmitting device (102) communicatively coupled to a receiving device (108) through a transmission medium (106).

A transmitting device (102) is any electronic device that transmits data to another device. Likewise, a receiving device (108) is any electronic device that receives data from another device. Various electronic devices such as desktop computers, laptop computers, tablet computers, and mobile smart phones transmit data to, and receive data from, other devices. These devices may use a variety of networking technologies to communicate with one another.

A transmission medium (106) is any medium that conveys a data signal from one location to another. In some cases, the transmission medium (106) may be a physical structure such as an Ethernet cable, a coaxial cable, or a fiber optic cable. In some cases, the transmission medium (106) may be electromagnetic fields such as are commonly used in wireless communication technologies.

A computer network includes a variety of networking devices such as routers and switches which provide for the network structure. Some of these devices may be equipped with Energy Efficient Ethernet (EEE) technology. EEE refers to a subset of the 802.3 standards defined by the Institute of Electrical and Electronics Engineers (IEEE). Specifically, EEE refers to standards and protocols that provide for reduced power consumption by networking devices. One feature of EEE is a low power idle mode. A networking device will go into this low power idle mode when no data is being transferred to or from that device. That device will come out of the low power idle mode when a link is established to or from that device.

Networking protocols typically cause data to start streaming from a transmitting device (102) to a receiving device (108) right after the link between the two devices has been established. If the receiving device (108) has not come out of low power mode by the time the first bits of the data stream arrive at the receiving device (108), then some of that data will be lost. To compensate for this timing discrepancy, either the transmitting device (102) or receiving device (108) can place the data stream into a streaming FIFO buffer (104). The FIFO buffer (104) can be designed to cause enough of a delay in the data so as to provide the receiving device (108) enough time to come out of low power idle mode. However, if the receiving device (108) does not support EEE capability and does not have a low power idle mode, then placing the data into the buffer causes an unnecessary delay in the transmission of data.

Figure 2A:
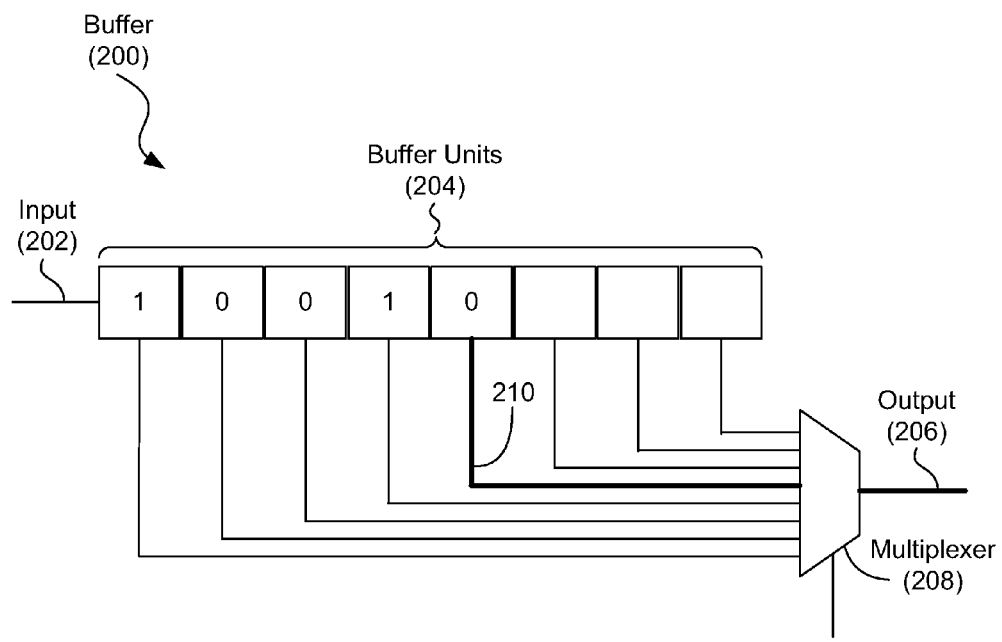
FIGS. 2A and 2B are diagrams illustrating operation of the variable depth buffer, according to one example of principles described herein.
Figure 2B:
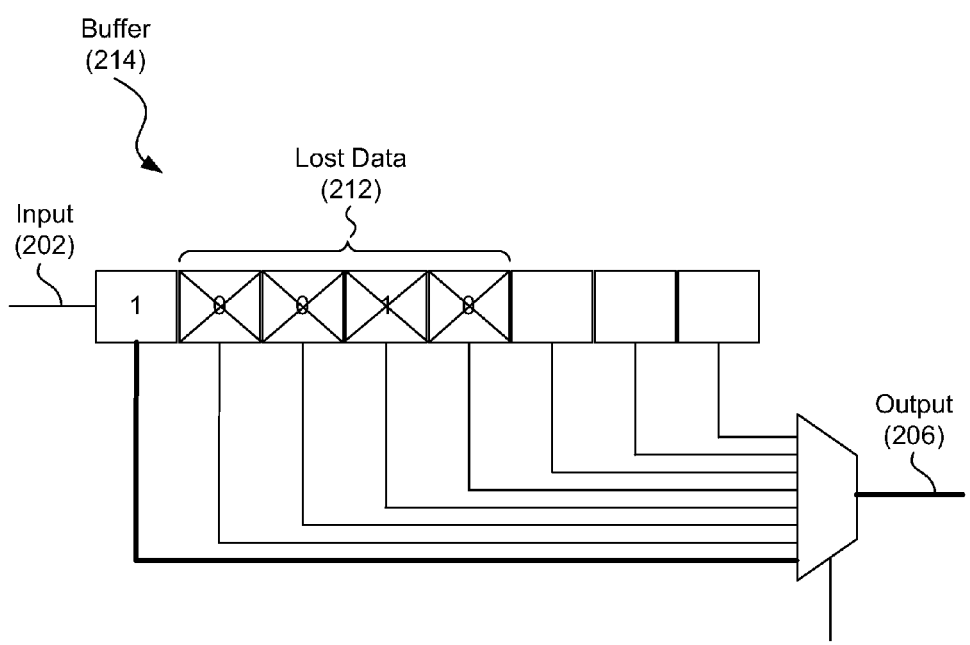

FIGS. 2A and 2B are diagrams showing an illustrative operation of a variable depth buffer (200). According to certain illustrative examples, the variable depth buffer (200) includes a set of buffer units (204), an input (202), a multiplexer (208), and an output (206). Data is placed into the input (202) of the buffer (200), flows through the buffer (200) until it reaches the selected line (210) of the multiplexer (208), and then flows to the output (206).

In one example, a buffer unit (204) corresponds to one bit of data. Thus, each buffer unit (204) may be a single bit storage unit that stores a logical "1" or a logical "0". For purposes of illustration, the buffer (200) illustrated in FIG. 2 illustrates a buffer with only eight buffer units. However, a practical variable depth buffer (200) may comprise a much larger number of buffer units (204).

The flow of data through the buffer (200) can be controlled by a clock signal. A clock signal is a pulsating signal that is used to drive digital logic circuitry. At each clock cycle, a bit of data is placed into the first buffer unit. Additionally, the data currently within the buffer units shift to a subsequent numbered buffer unit (204). A bit of data placed into the buffer will move down the length of buffer units, one after the other, until it reaches the last buffer unit. On the next clock cycle, the bit of data that is within the last buffer unit will be fed to the output (206) through the multiplexer (208).

The "last" buffer unit in the buffer will change to give the buffer its variable depth. Which buffer unit is the "last" will depend on which input to the multiplexer (208) is selected to be fed to the output (206) of the multiplexer (208). As mentioned above, a multiplexer (208) is a digital circuit element that selects among several inputs to be fed to a single output. In one example, each buffer unit is connected to one input of the multiplexer (208). Thus, the last buffer unit (204), as determined by the selected line (310) connected to the multiplexer (208), will set the depth of the buffer (200).

In the example shown in FIG. 2A, the fifth buffer unit from the input (202) is selected as the final buffer unit. Thus, the data that enters the buffer will move from the first buffer unit to the fifth buffer unit and then exit the buffer through the multiplexer (208).

To maximize the depth of the variable depth buffer (200), the multiplexer (208) is instead set to select the eighth buffer unit. In this case, data entering the buffer (200) would flow through every buffer unit (204).

To minimize the depth of the variable depth buffer (200), the multiplexer (208) is instead set to select the input line connected to the first buffer unit. In this case, data would flow through only one buffer unit (204) of the buffer (200) before being output.

FIG. 2B is a diagram illustrating the case where the depth of the buffer (214) is reduced while data is flowing through the buffer (214). According to certain illustrative examples, when the depth is reduced, data will begin flowing out from a buffer unit closer to the input. The data (212) in the buffer units between the original selected buffer unit and the newly selected buffer unit (204) will then become lost. In order to avoid this loss, the depth of the buffer should be set before data begins to flow through the buffer (200).

In some cases, each buffer unit (204) may hold more than one bit of data. For example, each buffer unit (204) may hold four bits of data. In this case, each of the four bits stored within a particular buffer unit will be transferred to the subsequent buffer unit at each clock cycle.

In some cases, not every buffer unit (204) is connected to a multiplexer input. For example, every other buffer unit (204) may be connected to a multiplexer input. In a further example, every four buffer units (204) may be connected to a multiplexer input. The number of buffer units (204) that are connected to multiplexer inputs may be according to the design purposes. Having every buffer unit connected to a multiplexer input provides a higher resolution of buffer length adjustment but will have to be controlled by more digital logic circuitry. Conversely, having fewer of the buffer units connected to multiplexer inputs provides a lower resolution of buffer depth adjustment but will allow for less digital logic circuitry to control.

Figure 3:
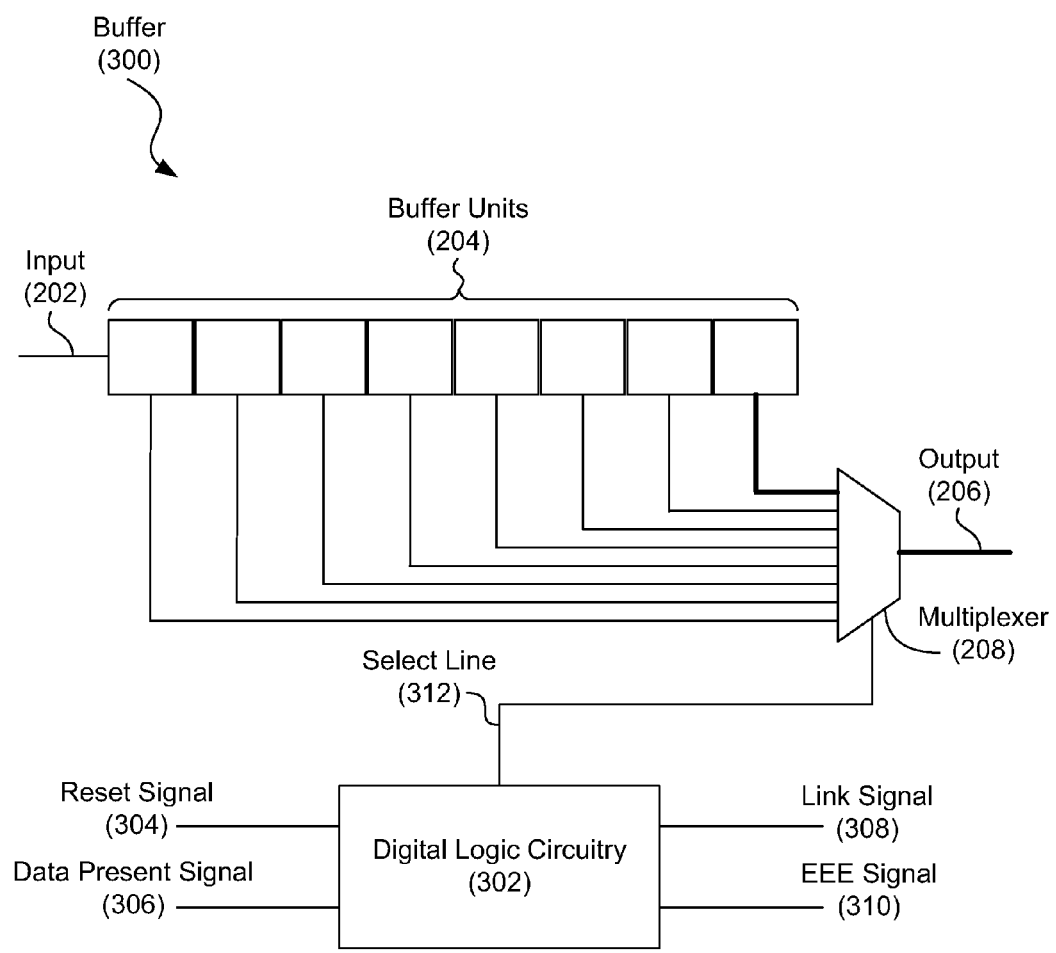
FIG. 3 is a diagram showing an illustrative variable depth buffer controlled by digital logic circuitry, according to one example of principles described herein.

FIG. 3 is a diagram showing an illustrative variable depth buffer (300) controlled by digital logic circuitry (302). The digital logic circuitry (302) may act as a state machine. A state machine is a logical element that provides one or more outputs based both on the current state of the state machine and a number of input signals received by the state machine. According to certain illustrative examples, the inputs to the state machine may be a variety of external signals including, but not limited to, a reset signal (304), a data present signal (306), a link signal (308), and an EEE signal (310). The output of the state machine may be one or more select lines (312) connected to the multiplexer (208).

The reset signal (304) is used to reset the state of a state machine to an initial state. The reset signal (304) may be sent to the state machine digital logic circuitry (302) when the electronic device using the variable depth buffer is either first turned on or is reset. In one example, the reset signal may, under normal conditions, provide a low digital signal to the digital logic circuitry. To engage the reset function of the digital logic circuitry (302), a high digital signal may be sent along the reset signal line.

The data present signal (306) is used to indicate whether or not data is flowing through the buffer. This can help the state machine decide whether or not to change the depth of the buffer. In one example, a low digital signal may indicate that no data is flowing through the buffer and a high digital signal may indicate that there is data flowing through the buffer.

The link signal (308) is used to indicate that a link is established between the device utilizing the variable depth buffer and a receiving device. In one example, a low digital signal may indicate that there is no link to a receiving device and a high digital signal may indicate that there is an established link to a receiving device. Once a link has been established, the transmitting device utilizing the buffer may determine whether or not the receiving device offers EEE capability and goes into a low power idle mode. The EEE signal (310) may then be used to indicate to the state machine whether or not the receiving device offers EEE capability.

Figure 4:
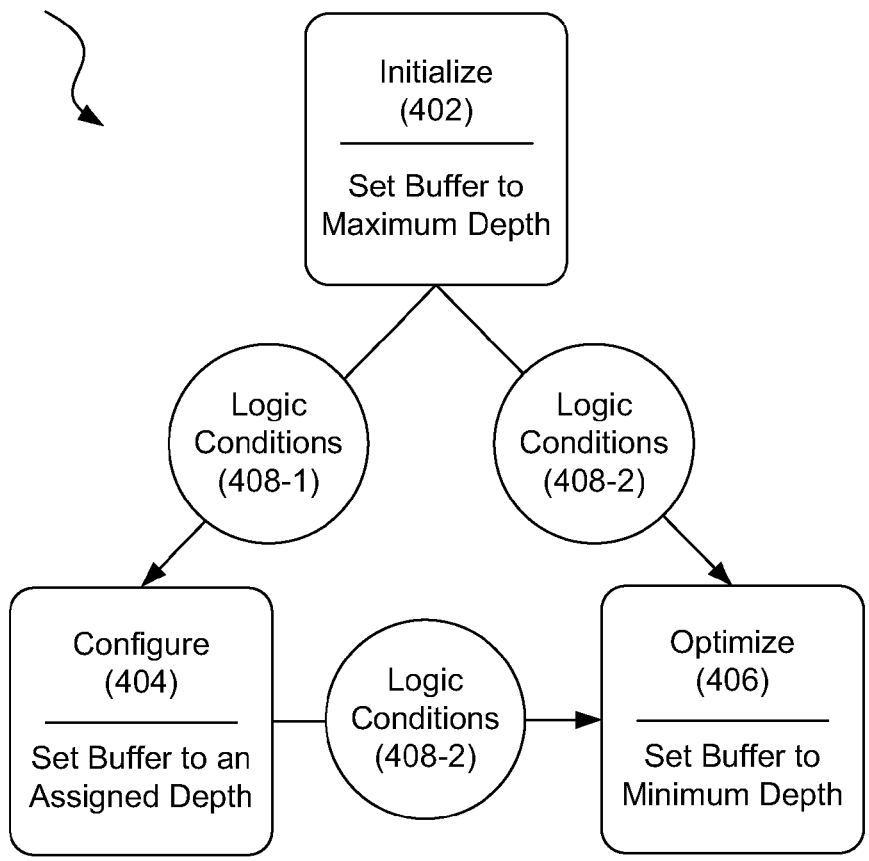
FIG. 4 is a diagram showing an illustrative state diagram for digital logic circuitry controlling a variable depth buffer, according to one example of principles described herein.

FIG. 4 is a diagram showing an illustrative state diagram (400) for a state machine controlling a variable depth buffer. A state diagram is used to illustrate the states of a state machine and under what conditions the state machine transitions between those states. According to certain illustrative examples, the state machine may have at least three states including an initialize state (402), a configure state (404), and an optimize state (406). Under certain logical conditions (408), the state machine may transition between these states. The states illustrated and described herein are not an exhaustive list of all possible states that may be used by a state machine embodying principles described herein.

The initialize state (402) indicates the state of the digital logic circuitry (e.g. 302, FIG. 3) comprising the state machine. In this state, the depth of the buffer may be set to its maximum depth. This can be done by sending the appropriate signal to the select lines (e.g. 312, FIG. 3) of the multiplexer. The state machine will remain in this state until the appropriate logical conditions are met that will cause it to move to another state.

In one example, if certain logical conditions (408-1) are met, the state machine will transition to the configure state (404). The configure state (404) allows the depth of the buffer to be selected through a software-based configuration program. For example, the program may send instructions to the state machine to change the depth of the buffer. If there is currently no link established between the device utilizing the buffer and a receiving device and the requested assigned depth is not the maximum depth, then the depth of the depth buffer will be set to the assigned depth.

When the state machine is in either the initialize state (402) and the configure state (404) and it receives certain logical conditions, then the state machine may transition to the optimize state. At the optimize state, the buffer length is set to a minimum. Thus, the output of the buffer will be the same as the first buffer unit. Thus, the entire buffer length is basically bypassed. The logic conditions (308-2) that cause a transition to the optimize state (406) may be that there is a link established, there is no data present in the buffer, and the receiving device does not offer EEE capability.

Figure 5:
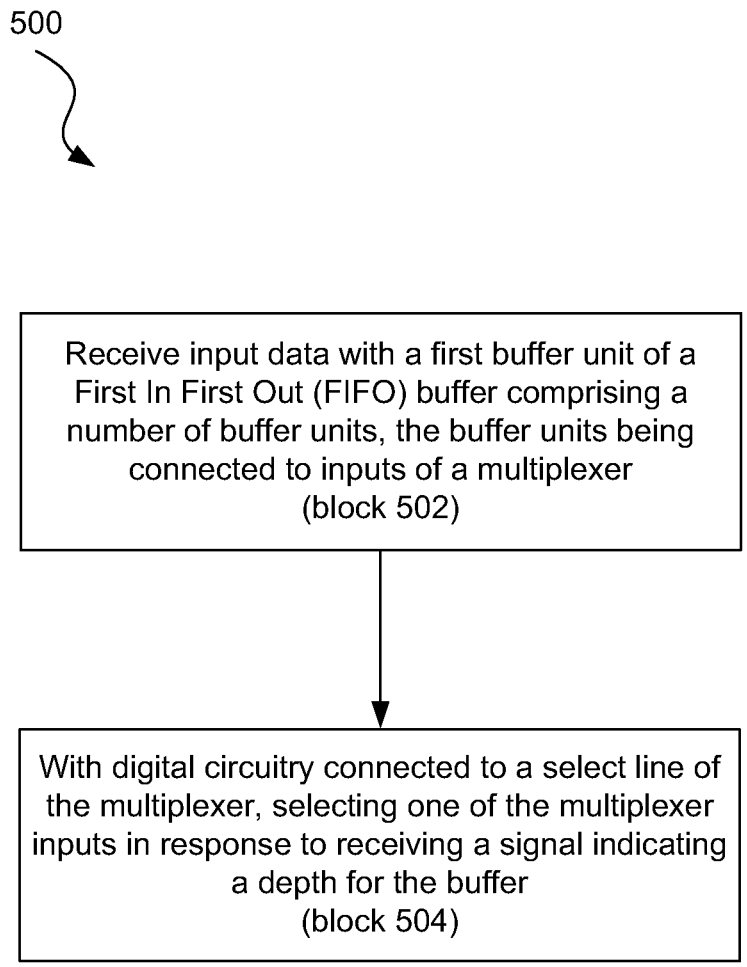
FIG. 5 is a flowchart showing an illustrative method for varying the depth of a buffer, according to one example of principles described herein.

FIG. 5 is a flowchart showing an illustrative method for varying the depth of a buffer. According to certain illustrative examples, the method includes receiving data (block 502) with a first buffer unit of a First In First Out (FIFO) buffer comprising a number of buffer units, the buffer units being connected to inputs of a multiplexer and with digital logic circuitry connected to a select line of the multiplexer, selecting (block 504) one of the multiplexer inputs in response to receiving a signal indicating a depth for the buffer.

In conclusion, through use of methods and systems embodying principles described herein, a FIFO buffer that is readily adaptable to a variety of purposes is realized. By varying the depth of the FIFO buffer, electronic devices that use that buffer may exercise greater versatility and operate more efficiently.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A variable depth buffer comprising:
   a set of buffer units to receive input data and to output the received data in a First in First Out (FIFO) manner, with links between said buffer units such that said input data is to be transferred sequentially from a first buffer unit that initially receives said input data to each subsequent buffer unit in said set; and
   a multiplexer having inputs and an output, wherein the inputs are connected to respective outputs of said buffer units through respective lines, wherein the multiplexer is to selectively operate one of the buffer units as a final buffer unit from which the multiplexer is to receive data out of the buffer units to be outputted through the output of the multiplexer, and wherein the multiplexer is to vary a depth of said variable depth buffer depending on which buffer unit in the set of buffer units is selected to operate as the final buffer unit.

2. The variable depth buffer of claim 1, further comprising digital logic circuitry to select one of said inputs of said multiplexer based on at least one received signal, wherein the selected one of said inputs is connected to the output of the buffer unit selected to operate as the final buffer unit.

3. The variable depth buffer of claim 2, wherein said digital logic circuitry is to select one of said inputs of said multiplexer based on whether a receiver device that is to receive the data outputted through the output of the multiplexer supports Energy Efficient Ethernet (EEE) during an initialization of a link to said receiver device.

4. The variable depth buffer of claim 2, wherein said digital logic circuitry is to respond to a signal indicating that data is present within said variable depth buffer.

5. The variable depth buffer of claim 2, wherein said digital logic circuitry comprises a reset function triggered by receipt of a reset signal.

6. The variable depth buffer of claim 2, wherein said digital logic circuitry is to respond to a signal indicating that a link is established to said receiver device.

7. A method for varying the a depth of a buffer composed of a set of buffer units to receive and output data in a First in First out (FIFO) manner and a multiplexer, wherein the buffer units have outputs that are connected to respective inputs of the multiplexer, the method comprising:

receiving, in the multiplexer, a signal indicating a depth of the buffer, wherein the depth of the buffer is controlled through variable selection of one of the buffer units to operate as a final buffer unit;

selecting, by digital logic circuitry, the input of the multiplexer that is connected to the buffer unit that results in the depth of the buffer indicated in the received signal from which to receive the input data;

receiving input data with a first buffer unit of the set of buffer units;

sequentially transferring the input data from the first buffer unit to each subsequent buffer unit in the set until the input data reaches the final buffer unit of the set of buffer units; and receiving the input data from the final buffer unit.

8. The method of claim 7, wherein the multiplexer comprises an output, the method further comprising:

sending said input data from said output of said multiplexer to a receiver device.

9. The method of claim 8, further comprising:

determining whether the receiver device does not support Energy Efficient Ethernet (EEE); and setting the depth of the buffer to a minimum depth in response to a determination that the receiver device does not support EEE.

10. The method of claim 7, wherein said buffer units comprise at least one bit of data.

11. The method of claim 7, further comprising:

receiving, in the digital logic circuitry, at least one of: a signal indicating data is present within said buffer, a signal indicating that a receiver device to receive data from said output of said multiplexer supports EEE, a reset signal, and a signal indicating that a link is established to said receiver device.

12. A variable depth First In First Out (FIFO) buffer, said variable depth FIFO buffer comprising:

an input;

a set of buffer units, a first buffer unit of said buffer units connected to said input;

a multiplexer comprising:

input lines connected to respective ones of said buffer units; and an output to be communicatively coupled to a receiver device; and digital logic circuitry connected to a select line of said multiplexer, said digital logic circuitry to set a depth of said variable depth FIFO buffer through variable selection of which of said buffer units to connect to said output of said multiplexer;

wherein said digital logic circuitry is to set said depth based on whether said receiver device supports Energy Efficient Ethernet (EEE).

13. The variable depth FIFO buffer of claim 12, wherein a determination as to whether said receiver device supports EEE is to be determined through receipt of a logic signal.

14. The variable depth FIFO buffer of claim 12, wherein the depth of said variable depth FIFO buffer is further set based on at least one of: a signal indicating whether data is in said variable depth FIFO buffer, a signal indicating whether a link to said receiver device has been initialized, and a reset signal.

15. The variable depth FIFO buffer of claim 12, wherein said buffer units hold at least one bit of data.

* * * * *

UNITED STATES PATENT AND TRADEMARK OFFICE
CERTIFICATE OF CORRECTION

| | | |
|---|---|---|
| PATENT NO. | : 8,635,389 B2 | Page 1 of 1 |
| APPLICATION NO. | : 13/114676 | |
| DATED | : January 21, 2014 | |
| INVENTOR(S) | : Daniel Joseph Dove | |

It is certified that error appears in the above-identified patent and that said Letters Patent is hereby corrected as shown below:

In the Claims

In column 7, line 4, in Claim 7, delete "the a" and insert -- a --, therefor.

Signed and Sealed this
Thirteenth Day of May, 2014

Michelle K. Lee
*Deputy Director of the United States Patent and Trademark Office*